US007509316B2

(12) United States Patent
Greenblatt et al.

(10) Patent No.: US 7,509,316 B2
(45) Date of Patent: Mar. 24, 2009

(54) TECHNIQUES FOR PERFORMING POLICY AUTOMATED OPERATIONS

(75) Inventors: Bruce Greenblatt, San Jose, CA (US);
Claudia Chandra, Cupertino, CA (US);
Wen Cheng, San Jose, CA (US)

(73) Assignee: Rocket Software, Inc., Newton, MA (US)

( * ) Notice: Subject to any disclaimer, the term of this patent is extended or adjusted under 35 U.S.C. 154(b) by 853 days.

(21) Appl. No.: 10/877,501

(22) Filed: Jun. 24, 2004

(65) Prior Publication Data

US 2005/0033757 A1 Feb. 10, 2005

Related U.S. Application Data

(63) Continuation-in-part of application No. 10/232,875, filed on Aug. 30, 2002, now Pat. No. 7,092,977.

(60) Provisional application No. 60/482,787, filed on Jun. 25, 2003, provisional application No. 60/316,764, filed on Aug. 31, 2001, provisional application No. 60/358,915, filed on Feb. 21, 2002.

(51) Int. Cl.
*G06F 17/30* (2006.01)
*G06F 12/00* (2006.01)

(52) U.S. Cl. .............................. 707/6; 707/102; 707/200
(58) Field of Classification Search .................. 707/2–6; 717/170–171
See application file for complete search history.

(56) References Cited

U.S. PATENT DOCUMENTS

| 4,901,231 A | 2/1990 | Bishop et al. |
| 5,053,948 A | 10/1991 | DeClute et al. |
| 5,063,523 A | 11/1991 | Vrenjak |
| 5,131,087 A | 7/1992 | Warr |

(Continued)

FOREIGN PATENT DOCUMENTS

WO WO 03/021441 3/2003

(Continued)

OTHER PUBLICATIONS

International Preliminary Patentability Report (including Written Opinion) received for corresponding PCT/US2004/020066.

(Continued)

*Primary Examiner*—Diane Mizrahi
(74) *Attorney, Agent, or Firm*—Barlow, Josephs & Holmes, Ltd.

(57) ABSTRACT

Techniques for automatically performing various data and storage management operations in a storage environment. The operations to be performed are automatically determined based upon policies configured for the data and storage environment. For a selected operation, one or more files on which the operation is to be performed are also automatically determined. The one or more files may be selected using different techniques based upon characteristics of the files and also based upon the operation to be performed. Target storage units, if need for the operation, are also automatically determined. The operations are then performed on the selected files. Examples of policy-driven operations include copying a file, moving a file, deleting a file, archiving a file, backing-up a file, restoring a file, migrating a file, recalling a file, etc.

48 Claims, 4 Drawing Sheets

U.S. PATENT DOCUMENTS

| | | | |
|---|---|---|---|
| 5,202,982 | A | 4/1993 | Gramlich et al. |
| 5,276,867 | A | 1/1994 | Kenley et al. |
| 5,317,728 | A | 5/1994 | Tevis et al. |
| 5,333,315 | A | 7/1994 | Saether et al. |
| 5,367,698 | A | 11/1994 | Webber et al. |
| 5,471,677 | A | 11/1995 | Imanaka |
| 5,475,834 | A | 12/1995 | Anglin et al. |
| 5,485,606 | A | 1/1996 | Midgley et al. |
| 5,506,986 | A | 4/1996 | Healy |
| 5,606,689 | A | 2/1997 | Nakagawa |
| 5,689,681 | A | 11/1997 | Petersen |
| 5,701,415 | A | 12/1997 | Wei |
| 5,708,806 | A | 1/1998 | DeRose et al. |
| 5,778,395 | A | 7/1998 | Whiting et al. |
| 5,798,766 | A | 8/1998 | Hayashi et al. |
| 5,819,296 | A | 10/1998 | Anderson et al. |
| 5,873,103 | A | 2/1999 | Trede et al. |
| 5,933,603 | A | 8/1999 | Vahalia et al. |
| 5,978,815 | A | 11/1999 | Cabrera et al. |
| 5,983,318 | A | 11/1999 | Willson et al. |
| 5,991,753 | A | 11/1999 | Wilde |
| 6,023,709 | A | 2/2000 | Anglin et al. |
| 6,035,373 | A | 3/2000 | Iwata |
| 6,038,379 | A | 3/2000 | Fletcher et al. |
| 6,154,817 | A | 11/2000 | Mohan et al. |
| 6,269,382 | B1 | 7/2001 | Cabrera et al. |
| 6,330,572 | B1 | 12/2001 | Sitka |
| 6,330,610 | B1 | 12/2001 | Doctor et al. |
| 6,336,175 | B1 | 1/2002 | Shaath et al. |
| 6,339,793 | B1 | 1/2002 | Bostian et al. |
| 6,366,988 | B1 | 4/2002 | Skiba et al. |
| 6,370,545 | B1 | 4/2002 | Shaath |
| 6,404,925 | B1 | 6/2002 | Foote et al. |
| 6,415,280 | B1 | 7/2002 | Farber et al. |
| 6,438,642 | B1 | 8/2002 | Shaath |
| 6,449,731 | B1 | 9/2002 | Frey, Jr. |
| 6,453,325 | B1 | 9/2002 | Cabrera et al. |
| 6,460,070 | B1 | 10/2002 | Turek et al. |
| 6,466,952 | B2 | 10/2002 | Hanes et al. |
| 6,493,756 | B1 | 12/2002 | O'Brien et al. |
| 6,519,637 | B1 | 2/2003 | Arkeketa et al. |
| 6,584,497 | B1 | 6/2003 | Case et al. |
| 6,631,477 | B1 | 10/2003 | LeCrone et al. |
| 6,654,864 | B2 | 11/2003 | Shaath et al. |
| 6,662,235 | B1 | 12/2003 | Callis et al. |
| 6,678,248 | B1 | 1/2004 | Haddock et al. |
| 6,839,766 | B1 | 1/2005 | Parnafes et al. |
| 6,915,338 | B1 | 7/2005 | Hunt et al. |
| 6,920,447 | B2 | 7/2005 | Pudipeddi et al. |
| 6,941,560 | B1 | 9/2005 | Lowry et al. |
| 6,990,667 | B2 | 1/2006 | Ulrich et al. |
| 7,092,977 | B2 * | 8/2006 | Leung et al. ............... 707/205 |
| 2001/0034795 | A1 | 10/2001 | Moulton et al. |
| 2001/0037475 | A1 | 11/2001 | Bradshaw et al. |
| 2002/0107878 | A1 | 8/2002 | Tsuchida et al. |
| 2002/0138251 | A1 | 9/2002 | Geary |
| 2002/0174139 | A1 | 11/2002 | Midgley et al. |
| 2002/0174296 | A1 | 11/2002 | Ulrich et al. |
| 2003/0005457 | A1 | 1/2003 | Faibish et al. |
| 2003/0046270 | A1 | 3/2003 | Leung et al. |
| 2003/0046313 | A1 | 3/2003 | Leung et al. |
| 2003/0115204 | A1 | 6/2003 | Greenblatt et al. |
| 2004/0039891 | A1 | 2/2004 | Leung et al. |
| 2004/0049513 | A1 | 3/2004 | Yakir et al. |
| 2004/0054656 | A1 | 3/2004 | Leung et al. |
| 2004/0083202 | A1 | 4/2004 | Mu et al. |
| 2004/0163029 | A1 | 8/2004 | Foley et al. |
| 2005/0015409 | A1 | 1/2005 | Wen et al. |
| 2005/0021566 | A1 | 1/2005 | Mu |
| 2006/0010150 | A1 | 1/2006 | Shaath et al. |
| 2006/0047540 | A1 * | 3/2006 | Hutten et al. ................. 705/4 |
| 2006/0074986 | A1 * | 4/2006 | Mallalieu et al. ......... 707/104.1 |

FOREIGN PATENT DOCUMENTS

| | | |
|---|---|---|
| WO | WO 03/025795 | 3/2003 |
| WO | WO 03/052620 | 6/2003 |
| WO | WO 2004/021123 | 3/2004 |
| WO | WO 2004/021223 | 3/2004 |
| WO | WO 2004/021224 | 3/2004 |
| WO | WO 2004/021225 | 3/2004 |
| WO | WO 2004/051481 | 6/2004 |
| WO | WO 2004/109556 | 12/2004 |
| WO | WO 2004/109663 | 12/2004 |
| WO | WO 2005/001646 | 1/2005 |

OTHER PUBLICATIONS

Sun (Sun Microsystems, Inc., "Solstice Backup™ 5.5, Administration Guide", Part No. 806-1135-10, Sep. 1999, Revision A), p. 1-2, 140-141.

Moore et al., "Policy Core Information Model Extensions," Internet Draft, Draft-IETF-Policy-PCIM-EXT-06.TXT, Nov. 8, 2001, pp. 1-85 downloaded from http://www.watersprings.org/pub/id/draft-ietf-policy-pcim-ext-06.txt on Feb. 2, 2005.

Strassner et al., "Policy Framework Definition Language," Internet Draft, Draft-IETF-Policy-Framework-PFDL-00.TXT, Nov. 17, 1998, pp. 1-18 downloaded from http://www.watersprings.org/pub/id/draft-ietf-policy-framework-pfdl-00.txt on Mar. 2, 2005.

Waters et al., "Policy Framework Architecture," Internet Draft, Draft-IETF-Policy-Arch-00.TXT, Feb. 26, 1999, pp. 1-18 downloaded from http://www.watersprings.org/pub/id/draft-ietf-policy-arch-00-txt on Mar. 2, 2005.

Wolfson et al., "Managing Communication Networks by Monitoring Databases," *IEEE Trans. Software Engineering*, 17(9):944-953 (1991).

Bhattacharya et al., "Coordinating Backup/Recovery and Data Consistency Between Database and File Systems," *Procs. 2002 ACM SIGMOD Int. Conf. on Management of Data*, pp. 500-511 (2002).

HSM For NetWare- White Paper: A Guide to Hierarchical Storage Management from http://support.ca.com/techbases/hsm/HSMWhitePaper.html visited on Jan. 10, 2003.

Microsoft Corporation, Microsoft Windows 2000 Server white paper, Enterprise Class Storage in Windows 2000, 1999, pp. 11, 19, 20.

The PC Guide, May 11, 2001, http://web.archive.org/web/20010511060256/http://www.pcguide.com/ref/hdd/file/ntfs/sec_Res.htm.

Powers, S. et al. (Jul. 1999). "Complementing AS/400 Storage Management Using Hierarchical Storage Management APIs, A Practical Approach to AS/400 Storage Management," International Technical Support Organization, from http://www.redbooks.ibm.com/pubs/pdfs/redbooks/sg244450.pdf visited on Jan. 10, 2003.

SafeCapacity™ User's Manual Version 2.14 (Jan. 1, 2002) Solution-Soft, Santa Clara, CA 48 pages total.

Siyan, K.S., "Windows 2000 Server Professional Reference, Jul. 10, 2000, ISBN 0-7357-0952-1," Implementing File System Security Using File Permissions, chapter 9.

Welch et al., "A Resilient Application-Level Failure Detection System for Distributed Computing Environments," *Computers and Communications* (1995) IEEE Symposium on Jun. 27-29, 1995-1996.

* cited by examiner

| Policy | File Characteristics Info | File Usage Info | Storage Unit Sel. Info |
|---|---|---|---|
| P1 | File type is "Office files" | Last access <= 7 days | Local |
| P2 | File type is "Office files" | 7 days < Last access <= 30 days | Bandwidth > 40MB |
| P3 | File type is "Office files" | Last access > 30 days | NONE |
| P4 | File type is "Email files" | Last access <= 7 days | Volume group = New_vols |
| P5 | Relevance score >= 0.5 | Last access <= 30 days | Bandwidth > 40 MB |
| P6 | Null (default) | Last access <= 7 days | Local |
| P7 | Null (default) | Last access > 7 days | Bandwidth > 40 MB |

FIG. 4

TECHNIQUES FOR PERFORMING POLICY AUTOMATED OPERATIONS

CROSS-REFERENCES TO RELATED APPLICATIONS

The present application claims the benefit of U.S. Provisional Patent Application No. 60/482,787 filed Jun. 25, 2003, the entire contents of which are herein incorporated by reference for all purposes.

This application is continuation-in-part (CIP) of prior U.S. Non-Provisional application Ser. No. 10/232,875, filed Aug. 30, 2002 now issued as U.S. Pat. No. 7,092,977, which in turn claims the benefit of U.S. Provisional Patent Application No. 60/316,764 filed Aug. 31, 2001, and U.S. Provisional Patent Application No. 60/358,915 filed Feb. 21, 2002. The entire contents of application Ser. Nos. 10/232,875, 60/316,764, and 60/358,915 are herein incorporated by reference for all purposes.

The present application incorporates by reference for all purposes the entire contents of the following applications:

(1) U.S. Non-Provisional application Ser. No. 10/232,671 filed Aug. 30, 2002;
(2) U.S. Non-Provisional application Ser. No. 10/650,171 filed Aug. 27, 2003;
(3) U.S. Non-Provisional application Ser. No. 10/857,176 filed May 28, 2004; and
(4) U.S. Non-Provisional application Ser. No. 10/857,174 filed May 28, 2004.

BACKGROUND OF THE INVENTION

The present invention relates to data and storage management, and more particularly to techniques for performing automated data and storage management operations.

Data storage demands have grown dramatically in recent times as an increasing amount of data is stored in digital form. These increasing storage demands have given rise to heterogeneous and complex storage environments comprising storage systems and devices with different cost, capacity, bandwidth, and other performance characteristics. Due to their heterogeneous nature, managing storage of data in such environments is a complex and costly task.

A storage administrator generally has to perform several tasks to ensure availability and efficient accessibility of data. In particular, an administrator has to ensure that there are no outages in the storage environment due to lack of availability of storage space on any server, especially servers running critical applications. The administrator thus has to monitor space utilization on the various storage resources in the storage environment. Presently, this is done either manually or using software tools that generate signals (e.g., alarms, alerts) when certain capacity thresholds associated with the storage resources are reached or exceeded. When an overcapacity condition is detected, the administrator then has to manually determine the operations (e.g., move, delete, copy, archive, backup, restore, etc.) to be performed to resolve the condition. This may include determining storage units experiencing the over capacity conditions, determining an operation to be performed to resolve the condition, the files on which the operations are to be performed, etc. Performing these tasks manually is very time consuming and complex, especially in a storage environment comprising a large number of servers and storage units.

Further, changes in data location due to the operations that are performed may impact existing applications, users, and consumers of that data. In order to minimize this impact, the administrator has to make adjustments to existing applications to update the data location information (e.g., the location of the database, mailbox, etc). The administrator also has to inform users about the new location of moved data. Accordingly, many of the conventional storage management operations and procedures are not transparent to data consumers.

Several applications such as Hierarchical Storage Management (HSM) storage applications, Information Lifecycle Management (ILM) applications, etc. are available that are able to automate some of the operations that were traditionally manually performed by the system administrator. For example, a HSM application is able to migrate data along a hierarchy of storage resources to meet user needs while reducing overall storage management costs. The storage resources may be hierarchically organized based upon costs, speed, capacity, and other factors associated with the storage resources. For example, files may be migrated from online storage to near-line storage, from near-line storage to offline storage, and the like. ILM applications also automate some of the data and storage management operations.

While existing data and storage management applications automate some of the manual tasks that were previously performed by the administrator, the administrator still has to configure policies for the storage environment that specifically identify the storage units and data (e.g., the file(s)) on which the operations (e.g., migration, copy, move, delete, archive, etc.) are to be performed, the type of operations to be performed, etc. As a result, the task of defining storage policies becomes quite complex and cumbersome in storage environments comprising a large number of storage units. The problem is further aggravated in storage environments in which storage units are continually being added or removed.

Another disadvantage of some existing data and storage management applications is that the storage policies have to be defined on a per server basis. Accordingly, in a storage environment comprised of multiple servers, the administrator has to specify storage policies for each of the servers. This can also become quite cumbersome in storage environments comprising a large number of servers. Accordingly, even though conventional data and storage management applications reduce some of the manual tasks that were previously performed by administrators, they are still limited in their applicability and convenience.

BRIEF SUMMARY OF THE INVENTION

Embodiments of the present invention provide techniques for automatically performing various data and storage management operations in a storage environment. The operations to be performed are automatically determined based upon policies configured for the storage environment. For a selected operation to be performed, one or more files on which the operation is to be performed are also automatically determined. The one or more files may be selected using different techniques based upon characteristics of the files and also based upon the operation to be performed. Target storage units, if needed for the operation, are also automatically determined. The operations are then performed on the selected files. Examples of policy-driven operations that may be performed include copying a file, moving a file, deleting a file, archiving a file, backing-up a file, restoring a file, migrating a file, recalling a file, etc.

According to an embodiment of the present invention, techniques are provided for managing a storage environment comprising a plurality of storage units. A first policy is determined for the storage environment, wherein a first operation is associated with the first policy. A data value score is calculated for each file in a set of files stored on a first storage unit from the plurality of storage units. A first file is selected from the set of files for performing the first operation based upon the data value scores calculated for the files in set of files and based upon the first operation to be performed. The first operation is performed on the selected first file.

According to an embodiment of the present invention, a first selection technique is determined from a plurality of selection techniques determining based upon the first operation to be performed. A first file is then selected from the set of files for performing the first operation electing based upon data values scores calculated for the set of files by applying the first selection technique.

According to another embodiment of the present invention, techniques are provided for managing a storage environment comprising a plurality of storage units. Based upon a storage policy, a data value score is calculated for each file in a set of files stored on a first storage unit from the plurality of storage units. A first file is selected from the set of files based upon the data value scores calculated for the set of files. A first operation is performed on the selected first file.

According to another embodiment of the present invention, techniques are provided for managing a storage environment comprising a plurality of storage units. A signal to store a first file is received. Based upon a storage policy configured for the storage environment, a storage value score is calculated for each storage unit in a set of storage units from the plurality of storage units. A first storage unit is selected from the set of storage units based upon the storage value scores calculated for the storage units in the set of storage units. The first file is stored on the first storage unit.

The foregoing, together with other features, embodiments, and advantages of the present invention, will become more apparent when referring to the following specification, claims, and accompanying drawings.

BRIEF DESCRIPTION OF THE DRAWINGS

FIG. 4 depicts examples of policies (or rules) according to an embodiment of the present invention.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
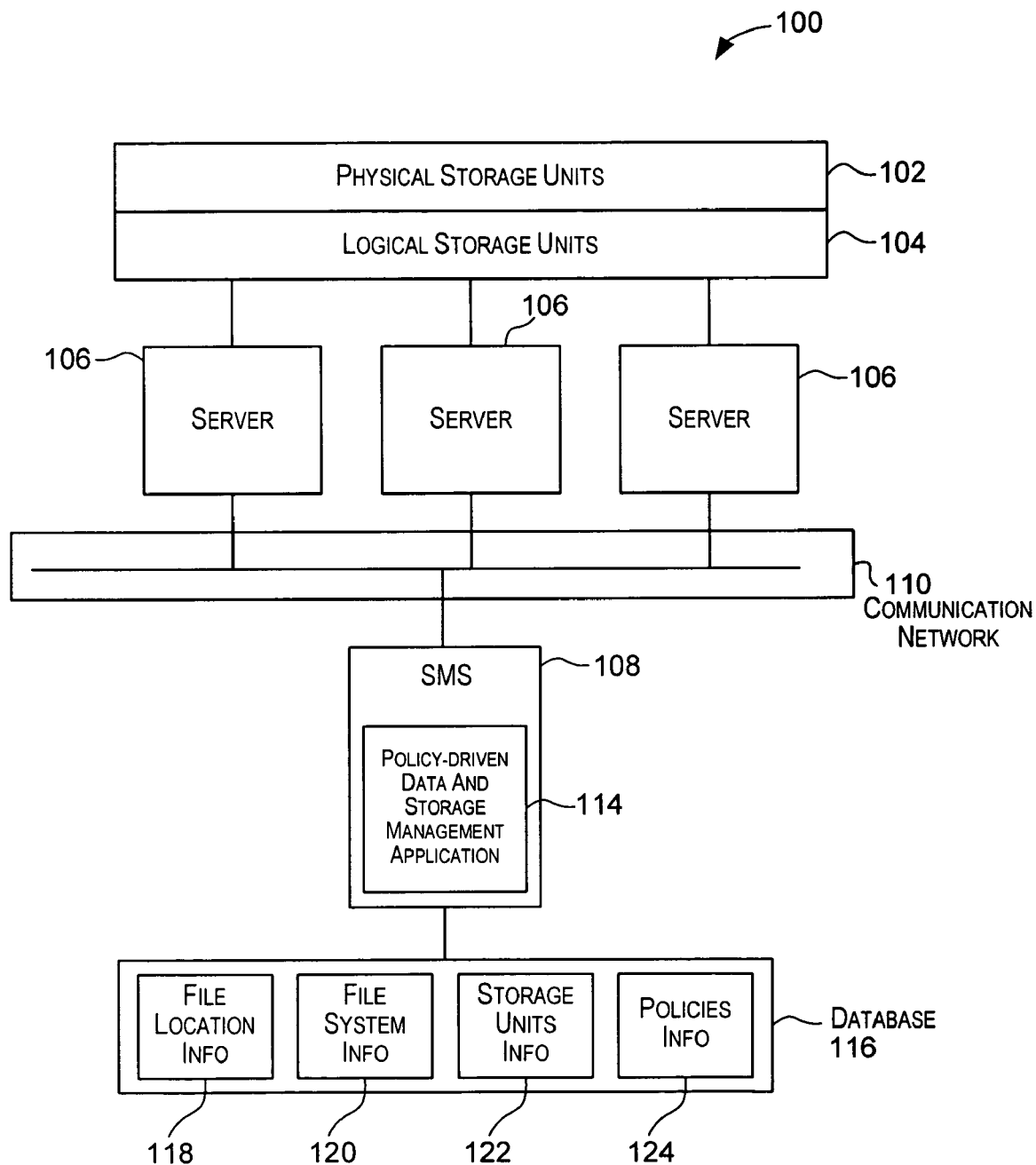
FIG. 1 is a simplified block diagram of a storage environment that may incorporate an embodiment of the present invention.

FIG. 1 is a simplified block diagram of a storage environment 100 that may incorporate an embodiment of the present invention. Storage environment 100 depicted in FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, storage environment 100 comprises physical storage devices or units 102 for storing data. Physical storage units 102 may include disk drives, tapes, hard drives, optical disks, RAID storage structures, solid state storage devices, SAN storage devices, NAS storage devices, and other types of devices and storage media capable of storing data. The term "physical storage unit" is intended to refer to any physical device, system, etc. that is capable of storing information or data.

Physical storage units 102 may be organized into one or more logical storage units 104 that provide a logical view of underlying disks provided by physical storage units 102. Each logical storage unit (e.g., a volume) is generally identifiable by a unique identifier (e.g., a number, name, etc.) that may be specified by the administrator. A single physical storage unit may be divided into several separately identifiable logical storage units. A single logical storage unit may span storage space provided by multiple physical storage units 102. A logical storage unit may reside on non-contiguous physical partitions. By using logical storage units, the physical storage units and the distribution of data across the physical storage units becomes transparent to servers and applications.

For purposes of describing the present invention, logical storage units 104 are considered to be in the form of volumes. However, other types of logical storage units are also within the scope of the present invention. The term "storage unit" is intended to refer to a physical storage unit (e.g., a disk) or a logical storage unit (e.g., a volume).

Several servers 106 are provided that serve as access points to data stored by storage units 102 or 104. For example, one or more volumes from logical storage units 104 may be assigned or allocated to each server from servers 106. A server 106 provides an access point for the one or more volumes allocated to that server.

A storage management server or system (SMS) 108 may be coupled to the storage units and servers 106 via communication network 110. Communication network 110 provides a mechanism for allowing communication between SMS 108, servers 106, and the storage units. Communication network 110 may be a local area network (LAN), a wide area network (WAN), a wireless network, an Intranet, the Internet, a private network, a public network, a switched network, or any other suitable communication network. Communication network 110 may comprise many interconnected computer systems and communication links. The communication links may be hardwire links, optical links, satellite or other wireless communications links, wave propagation links, or any other mechanisms for communication of information. Various communication protocols may be used to facilitate communication of information via the communication links, including TCP/IP, HTTP protocols, extensible markup language (XML), wireless application protocol (WAP), Fiber Channel protocols, protocols under development by industry standard organizations, vendor-specific protocols, customized protocols, and others.

SMS 108 may be configured to execute applications, processes, etc. that perform data and storage management functions. For example, as depicted in FIG. 1, SMS 108 executes a policy-driven data and storage management application or process (PDSMA) 114. According to an embodiment of the present invention, PDSMA 114 is configured to perform automated data and storage management operations for storage environment 100.

In one embodiment, PDSMA 114 is configured to detect signals (e.g., alarms, alerts, etc.) and conditions that trigger performance of data management operations. Responsive to detecting such a signal, PDSMA 114 may be configured to automatically determine one or more operations to be performed. The determination of the operations to be performed may be based upon policies configured for the storage environment. Various different operations may be performed including migrating files, moving files, copying files, deleting files, backing-up files, restoring files, archiving files, recalling files, etc.

PDSMA 114 is also configured to automatically determine the one or more files on which the determined operations are to be performed. The one or more files may be selected using different techniques based upon characteristics of the files and also based upon the operations to be performed. In one embodiment, data value scores (DVSs) are calculated for the files and the one or more files on which the operations are to be performed are determined based upon the DVSs. Different selection techniques, based upon the type of operation to be performed, may be applied to select the files based upon the DVS calculated for the files.

For operations (e.g., move, copy, etc.) that need a target storage unit, PDSMA 114 is also configured to automatically determine the target storage unit(s) for the operations. The operations are then performed on the selected files.

PDSMA 114 may be configured to automatically perform the operations until the conditions that triggered the detected signal have been resolved, until the time window for performing the operations has past, or until some other administrator-configurable condition. Accordingly, PDSMA 114 is configured to provide an automated policy-driven solution for performing data and storage management functions. The policies may be defined for the entire storage environment and do not have to be defined on a per-sever basis.

PDSMA 114 may be configured to perform automated data and storage management operations under various conditions. For example, PDSMA 114 may be configured to perform automated operations upon detecting a condition related to data utilization and storage capacity of a storage unit or group of storage units. In this regards, PDSMA 114 may be configured to monitor and gather information related to the capacity usage of storage units in the storage environment. For example, PDSMA 114 may be configured to monitor the available capacity of the various storage units, the used capacity of the storage units, etc. PDSMA 114 may also monitor the file system in order to collect information about the files such as file size information, access time information, file type information, etc. This monitored information may be used to detect conditions that require invocation of data and storage management operations.

The automated operations may also be performed when PDSMA 114 detects particular conditions such as conditions related to file characteristics (e.g., detects files more than 1-year old), device characteristics (e.g., a particular device is added or removed from the storage environment), etc. The automated operations may also be performed on a scheduled basis (e.g., on a periodic basis) or when requested by a user. Various other conditions may also be configured that trigger the performance of automated operations.

Various different types of operations may be performed by PDSMA 114 including migrating files, moving files, copying files, deleting files, backing-up files, restoring files, archiving files, recalling files, etc. These operations may be performed by PDSMA 114 or by other processes or applications in conjunction with PDSMA 114.

When a migration operation is performed, a portion (or even the entire file) of the file being migrated is migrated or moved from an original storage location on an original volume where the file is stored prior to the migration operation to a repository storage location on a repository volume. The migrated portion of the file may include, for example, the data portion of the file. In certain embodiments, the migrated portion of the file may also include a portion of (or the entire) metadata associated with the file. The metadata may comprise information related to attributes such as security attributes (e.g., ownership information, permissions information, access control lists, etc.), file attributes (e.g., file size, file creation information, file modification information, access time information, etc.), extended attributes (attributes specific to certain file systems, e.g., subject information, title information), sparse attributes, alternate streams, etc. associated with the file.

As result of a migration operation, a stub or tag file is left in place of the original file in the original storage location on the original volume. The stub file is a physical file that serves as an entity in the original storage location that is visible to users and applications and through which the users and applications can access the original file. Users and applications can use the stub file to access the migrated file as though the original file was still stored in the original storage location. When a request is received to access the migrated file, the repository storage location of the migrated data corresponding to the stub file is determined and the migrated file data is recalled (or demigrated) from the repository storage location back to the original storage location. The location of the migrated data may be determined from information stored in the stub file or from other sources. For example, database 116 depicted in FIG. 1 may store file location information 118 comprising information related to migrated files such as information identifying the original volume, the repository volume, information identifying the repository storage location, etc. In some embodiments, the metadata information may also be stored in database 116.

The information stored in a stub file may vary in different storage environments. For example, depending on the environment, a stub file may store information that is used to locate the migrated data, metadata comprising attributes associated with the migrated file, a portion of the data portion of the file, etc.

A recall operation is generally performed upon receiving a request to access a migrated file. In a recall operation migrated data for a migrated file is recalled or moved from the repository storage location (on the repository storage unit) back to the original storage location on the original storage unit. Data may be migrated and recalled to and from storage units 102 or 104 depicted in FIG. 1.

In the embodiment depicted in FIG. 1, PDSMA 114 is shown as being executed by SMS 108. In alternative embodiments, PDSMA 114 may be executed by various other data processing systems including server 106. The functionality of PDSMA 114 may be provided by software code or modules that are executed by various data processing systems. For example, the functionality provided by PDSMA 114 may be provided by multiple processes that are executed by one or more data processing systems depicted in FIG. 1. The functionality provided by PDSMA 114 may also be provided by hardware modules or a combination of software and hardware modules.

The information and statistical data monitored and gathered by PDSMA 114 may be stored in database 116 accessible to SMS 108. For example, as previously described, information related to migrated files may be stored as file location information 118. Information related to the file system may be stored as file system information 120 and information related to the storage units monitored by PDSMA 114 may be stored as storage units information 122. Information related to policies configured for the storage environment may also be stored in database 116 as policies information 124. Various formats may be used for storing the information. Database 116 may be a relational database, an object-oriented database, directory services, etc.

As previously stated, according to an embodiment of the present invention, PDSMA 114 is configured to perform automated processing based upon policies configured for the storage environment. Multiple policies may be defined for the data and storage environment. The policies may be configured by a user such as the administrator for the data and storage environment. Various techniques may be used for determining which policy to apply in any given situation. In some embodiments, the policy to be applied when a particular signal or condition is detected may be randomly chosen. In other embodiments, guidelines or rules may be specified for determining which policy to apply. For example, the policies may be ordered or prioritized and the ordering or priority information may be used to select which policy is to be applied.

According to an embodiment of the present invention, one or more operations may be associated with or specified by each policy. The order in which the operations are to be performed may also be specified. Accordingly, an operation to be performed is determined upon selecting a particular policy. The operations specified by or associated with a policy may include an operation to migrate a file, move a file, copy a file, delete a file, back-up a file, restore a file, archive a file, recall a file, etc. For purposes of clarity and simplicity, the following description assumes that a policy specifies a single operation to be performed. However, this is not intended to limit the scope of the present invention as recited in the claims.

A policy may also comprise conditions or criteria (referred to as "file selection information" or "file-related information") that are used to determine a set of one or more files on which the operation specified by the policy is to be performed. The conditions or criteria may be related to attributes or characteristics of files (e.g., file size, file type, etc.). The conditions may also be related to file usage information (e.g., when the file was created, last used, modified, etc.) The file selection information may comprise various conditions connected by Boolean connectors.

According to an embodiment of the present invention, scores (referred to as data value scores or DVSs) are generated for files for a particular policy based upon the file selection information associated or specified for the particular policy. A DVS for a file represents the degree to which the file matches the conditions specified by the file selection information for the policy. The DVSs are then used to select files for performing the policy-specified operation. Details related to calculation of DVSs are described below.

In one embodiment, the formula or technique used for computing a DVS for a file is the same irrespective of the policy-specified operation to be performed. In alternative embodiments, the technique or formula used to compute a DVS for a file depends on the operation to be performed. In such an embodiment, different formulae or techniques may be used for computing DVSs for a file for different operations. In one embodiment, information identifying the formula or technique to be used for computing a DVS for a file may be specified and associated with a policy.

After DVSs have been computed for a set of files, different selection techniques may be used to select a file from the set of files on which the policy-specified operation is to be performed based upon the DVSs associated with the files. According to an embodiment of the present invention, the determination of which selection technique to use or apply depends on the type of operation that is to be performed. For example, a first selection technique may be used for selecting a file for first type of operation (e.g., a backup operation) and a second selection technique that is different from the first selection technique may be used for selecting a file for a second type of operation (e.g., a delete operation).

For example, the files may be ranked based upon based upon their associated DVSs. Assuming that the DVSs provide a measure of the importance (value) of a file, a selection technique that selects the most valuable or important file (i.e., selects a file with the highest DVS) may be selected and applied for an operation of a first type such as a backup operation. However, a selection technique that selects the file with the lowest DVS, i.e., the least valuable file, may be selected and applied for an operation of a second type (e.g., a delete operation. Accordingly, different file selection techniques may be used for different types of operations to select files based upon DVSs computed for the files. In one embodiment, information identifying the selection technique to be applied for a particular operation may be associated or included in the policy information.

A policy may also comprise various other types of information. For example, a policy may comprise information (referred to as "storage unit selection information") that is used to determine a target storage unit for the operation specified by the policy that requires a target storage unit. For example, if the policy-specified operation is a file copy operation, the storage unit selection information for the policy may be used to determine a target storage unit to which the file is copied. The storage unit selection information may comprise conditions or criteria related to characteristics associated with storage units such as performance, availability, write-once read-many (WORM) type of devices, available storage capacity, constraints on storage units, etc.

According to an embodiment of the present invention, scores (referred to as storage value scores or SVSs) are computed for storage units based upon the storage unit selection information specified for a policy. A SVS for a storage unit represents the degree to which the storage unit matches the conditions specified by the storage unit selection information. The SVSs are then used to determine the storage units to be selected for the operation to be performed. Details related to calculation and use of SVSs is described below.

Figure 2:
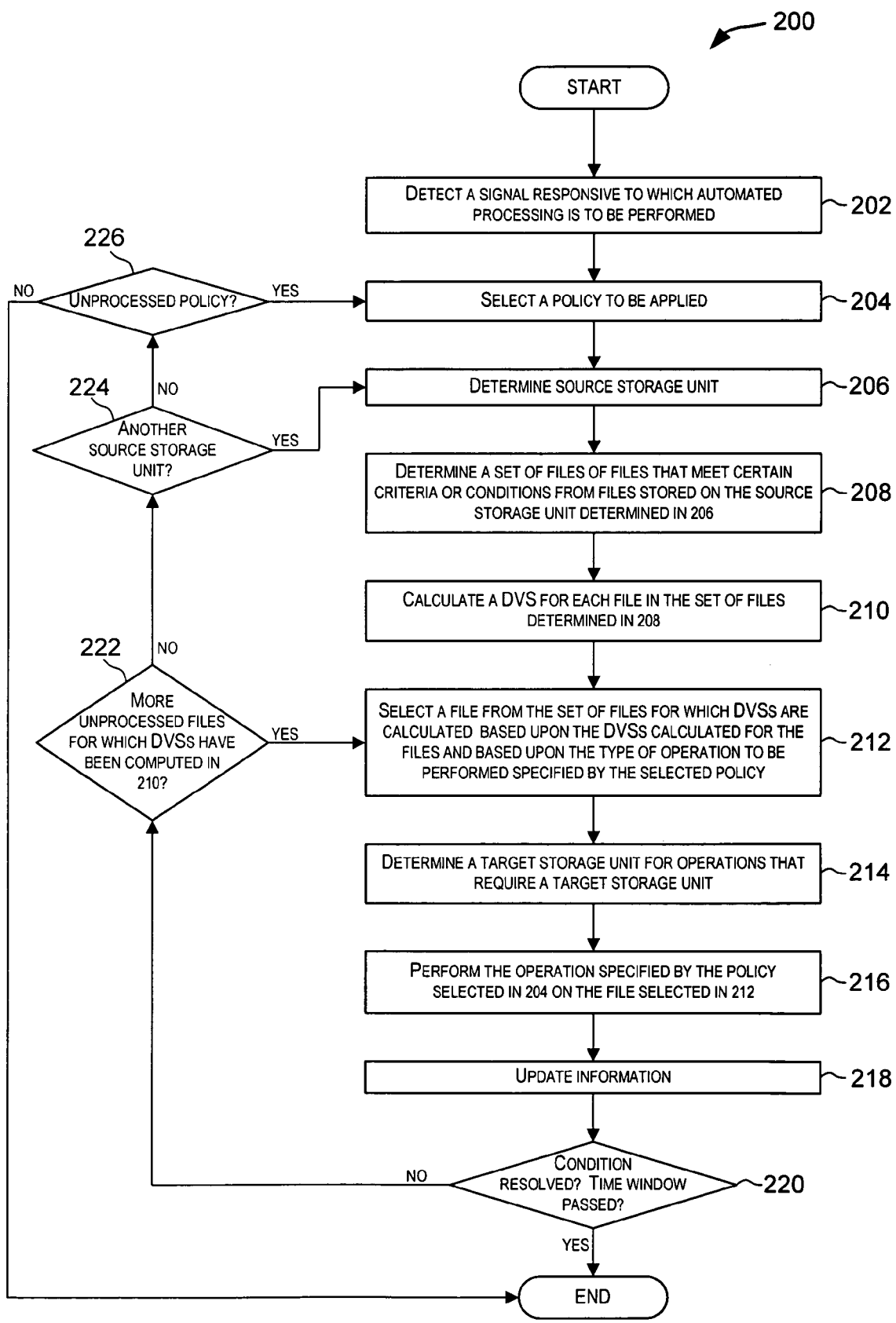
FIG. 2 is a simplified high-level flowchart depicting a method of performing automated processing in a storage environment according to an embodiment of the present invention.

FIG. 2 is a simplified high-level flowchart 200 depicting a method of performing automated processing in a storage environment according to an embodiment of the present invention. The method depicted in FIG. 2 may be performed by software code modules (e.g., PDSMA 114) executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention. The method depicted in FIG. 2 may be adapted to work with different implementation constraints.

As depicted in FIG. 2, processing is initiated when a signal is received or detected for a managed group of storage units (e.g., a managed group of volumes) responsive to which automated processing is to be performed (step 202). The signal may be detected by PDSMA 114 or some other application. The signal detected in 202 may be triggered due to various conditions related to the storage environment, related to storage units, related to file system characteristics, or other user-configurable conditions. For example, the signal may be detected in 202 due to some change in a monitored value or when the monitored value associated with a storage unit or the file system reaches or exceeds some threshold value. The threshold values may be configured by the user such as the administrator of the storage environment. For example, the signal may be triggered when available storage capacity on a volume from a managed set of volumes falls below a pre-configured threshold value. The threshold value may be configured on a per storage unit basis (e.g., on a per-volume basis) or may be configured for a group of storage units (e.g., for a group of volumes). As another example, PDSMA 114 may detect the presence of a file with a particular characteristic. for example, when a file is more than 1-year old and needs to be archived.

The signal detected in 202 may also be triggered by a user (e.g., by the storage system administrator). For example, the user may issue a command requesting that capacity balancing or file archiving operations be performed for a managed group of storage units. The signal may also be triggered by another application or system. For example, the signal may be triggered by a periodic or scheduled application such as a cron job in a UNIX environment (that may be scheduled by the administrator to execute every night), a scheduled task in Windows, etc.

A policy to be applied is then selected in response to the signal detected in 202 (step 204). The policy may be selected from multiple policies configured by a user (e.g., the administrator) for the storage environment. Various different techniques may be used for selecting the policy to be applied. According to one technique, a policy may be selected based upon the nature of the signal detected in 202. For example, signals may be mapped to policies and upon detecting a particular signal in 202, the policy mapped to (or corresponding to) that particular detected signal is selected in 204. According to another technique, priority information or ordering information associated with the policies may be used to determine the policy selected in 204. For example, a policy with a higher priority associated with it may be selected before a policy with a lower priority associated with it. In yet other embodiments, where policies are not prioritized (or where policies have the same priority) then any one of the policies may be selected in 204.

One or more operations may be associated with or specified by a policy. The order in which the operations are to be performed may also be specified. Accordingly, upon selecting a policy in 204, the operation that is to be performed is also determined in 204. For purposes of clarity and simplicity, the following description assumes that a policy specifies a single operation to be performed. However, this is not intended to limit the scope of the present invention as recited in the claims. The processing depicted in FIG. 2 is also applicable in situations where a policy identifies multiple operations to be performed.

A source storage unit is then determined (step 206). The source storage unit represents a storage unit storing one or more files on which the operation specified by the policy selected in 204 is to be performed. The source storage unit may be determined based upon the signal detected in step 202. For example, if the signal detected in 202 was triggered due to an overcapacity condition on a volume, then that volume may be selected as the source storage unit in 206. As another example, if the signal detected in 202 was triggered due to an over-capacity condition for a group of volumes, a volume from the group of volumes may be selected as the source storage unit in 206. Various other techniques may also be used to determine the source storage unit.

A set of files that meet certain criteria or conditions are then selected from the files stored on the source storage unit determined in 206 (step 208). The files selected in 208 represent potential candidates on which the operation specified by the policy selected in 204 is to be performed. Various different user-configurable criteria may be used for the selection in 208. The criteria may depend on the operation to be performed and also upon the signal detected in 202. For example, in one embodiment, only those files on the source storage unit that are larger than a certain user-configured file size may be selected in 208. In another embodiment, one or more conditions specified by the file selection information for the selected policy may be used to select the files in 208. Other pre-configured criteria may also be used for selecting the files in 208. The set of files selected in 208 may include non-migrated files (or original files), stub files corresponding to files that have been migrated, files storing the migrated data, or combinations thereof.

A DVS is then calculated for each file in the set of files determined in 208 (step 210). Details for computing DVSs according to an embodiment of the present invention are described below in further detail. The embodiment described below describes one way in which DVSs may be calculated and is not intended to restrict the scope of the present invention. Other techniques may also be used. In certain embodiments, the techniques used for calculating DVSs may depend on the operation to be performed. In such embodiments, the particular DVS calculation technique to be used may be specified by the policy selected in 204.

Step 208 is not required by the present invention and may not be performed in certain embodiments of the present invention. One reason for performing step 208 before step 210 is to reduce the number of files for which DVSs have to be calculated. However, in embodiments where step 208 is not performed, in step 210, DVSs may be calculated for all the files on the selected source storage unit.

A file from the set of files for which DVSs are calculated is then selected based upon the DVSs calculated for the files and based upon the type of operation to be performed specified by the selected policy (step 212). According to an embodiment of the present invention, in 212, a selection technique that is to be used for selecting a file from the set of files is determined. The selected selection technique is then applied to select a file based upon DVSs calculated for the set of files.

Various different techniques may be specified for the data and storage environment. According to an embodiment of the present invention, a particular selection technique is selected based upon the type of operation to be performed. For example, for an operation of a first type, a selection technique may be selected that selects a file with the lowest DVS from the set of files, whereas for an operation of a second type, a selection technique that selects a file with the highest DVS may be selected. Other selection techniques may be used for other types of operations. Accordingly, the technique used for selecting a file based upon DVSs depends on the type or identity of the operation specified by the selected policy that is to be performed on the selected file.

For example, consider an embodiment of the present invention where the DVS score for a file represents the extent to which the file matches the file selection information of the selected policy and represents the importance or value of the file—i.e., the higher the DVS, the closer the match and the more important or valuable the file. Accordingly, in this embodiment, a file having a higher DVS is considered more important (more valuable) than a file having a lower DVS associated with it. In this embodiment, for certain types of operations, the operations may be performed on less valuable files before more valuable files. Accordingly, for such an operation, a selection technique is selected that selects less valuable files before selecting more valuable files (i.e., selects files with low DVSs before selecting files with high DVSs). For example, if the type of operation specified by the selected policy is a delete operation, then files with lower DVSs will be selected for the delete operation before files with higher DVSs. For other types of operations, the more valuable files may be selected before the less valuable files. Accordingly, for such an operation, a selection technique is selected that selects more valuable files before selecting more valuable files (i.e., selects files with high DVSs before selecting files with low DVSs). For example, if the type of operation specified by the selected policy is a copy, move or backup operation, then files with higher DVSs will be selected for the operation before files with lower DVSs (i.e., it is more important to perform these operations on important or valuable files compared to less important or less valuable files).

As another example, for a move operation, the selection technique may also depend on the whether a file is to be moved from a high cost faster storage unit to a low cost slower storage unit (in which case the file with the lowest DVS may be selected) or from a low cost slower storage unit to a higher cost faster storage unit (in which case the file with the highest DVS may be selected).

Accordingly, the selection technique that is selected depends upon the type (e.g., delete, copy, move from high cost storage unit to low cost storage unit, etc.) of operation to be performed. The selected selection technique is then applied to select a file based upon DVSs calculated for the files.

According to an embodiment of the present invention, the technique to be used for selecting the file in 212 may be specified by the selected policy. For example, the selected policy may include information identifying the selection technique to be used. The selection technique to be used may also be determined from other stored information.

A target storage unit is then determined for operations that require a target storage unit (step 214). Examples of operations that require a target storage unit include a move operation (where the target storage unit identifies the storage unit to which the selected file is to be moved), a copy operation (where the target storage unit identifies the storage unit to which the selected file is to be copied), a backup operation (where the target storage unit identifies the storage unit to which the selected file is to be backed-up), etc. Target storage units are not needed for some operations such as delete operations. Step 214 also need not be performed where the target storage unit for the operation is pre-configured or where the information is provided by the user. For example, for some backup operations, the backup medium may be predefined and thus it not necessary to perform step 214.

Various different techniques may be used for determining the target storage unit in 214. One simple technique may involve selecting a storage unit with the most available storage capacity. The techniques that are used to select a target storage unit may also depend on the operation to be performed. According to an embodiment, the administrator may specify criteria for selecting a target, and a storage unit (e.g., a volume) that satisfies the criteria is selected as the target storage unit. According to yet another embodiment, storage value scores (SVSs) may be generated for the eligible storage units and a target storage unit may be selected from the eligible storage units based upon the SVSs (e.g., the storage unit with the highest positive SVS may be selected as the target storage unit). Further details related to calculation and use of SVSs for determining a target storage unit according to an embodiment of the present invention are described below.

The operation specified by the selected policy is then performed on the selected file (step 216). If the operation requires a target storage unit, then the target storage unit determined in 214 is used. If the selected file is a migrated file (i.e., the operation is being performed on a stub file left in place of the migrated file), then the operation may be performed on the stub file without recalling the migrated data. Further details related to performing file operations on migrated files without recalling data are described in U.S. patent application Ser. No. 10/232,671 filed Aug. 30, 2002, U.S. patent application Ser. No. 10/650,171 filed Aug. 27, 2003, U.S. patent application Ser. No. 10/857,176 filed May 28, 2004, and U.S. patent application Ser. No. 10/857,174 filed May 28, 2004, the entire contents of which are herein incorporated by reference for all purposes.

Information stored for the storage environment may be updated to reflect the operation performed in 218 (step 218). For example, information (e.g., file location information 118, file system information 120, storage units information 122, etc.) stored in database 116 may be updated to reflect performance of the operation.

The processing depicted in FIG. 2 may be repeated until the condition that triggered the signal detected in 202 has been resolved, until the time window for performing the operations has not passed, or until some other administrator-configured condition. Accordingly, a check is made to determine if the condition has been resolved or the time window has passed or some other exit condition met (step 220). If the condition has been resolved or the time window has passed of if some other exit conditions has been met, then processing comes to an end.

If the condition has not been resolved and/or the time window has not passed, then a check is made to see if there are more unprocessed files for which DVSs have been computed in 210 (step 222). An unprocessed file is a file for which a DVS is calculated in 210 but no policy specified-operation has been performed on the file as yet during the present processing of FIG. 2. If at least one such unprocessed file exists, then the next unprocessed file is selected from the set of files per processing performed in 212 and processing continues as shown in FIG. 2. For example, the file with the next highest DVS score may be selected. If it is determined in 222 that all the files for which DVSs have been calculated have been processed (i.e., the operation specified by the selected policy has been performed on the files), then a check is made to see if another source storage unit may be selected (step 224). If it is determined that another storage unit may be determined, then a new storage unit is selected according to step 206 and then processing continues as shown in FIG. 2. If it is determined in 224 that no other source storage unit may be determined for the selected policy, then a check is made to see if there are any unprocessed policies (step 226). If there exists at least one previously unprocessed or unapplied policy (i.e., a policy that has not already been applied responsive to the signal detected in 202 during the present processing of flowchart 200), then the next unapplied or unprocessed policy is selected according to step 204 described above and processing then continues for the newly selected policy.

Accordingly, as described above, embodiments of the present invention automatically perform data and storage management operations based upon policies configured for the storage environment. Embodiments of the present invention monitor and detect conditions when data and storage management operations are to be performed. A policy and an operation to be performed are automatically selected. The source storage units and files on which the operation is to be performed are also automatically determined based upon DVSs calculated for the files. Different selection techniques may be used to select a file for the operation based upon the type of operation to be performed and DVSs calculated for the files. Target storage units may also be automatically determined. The operation is then performed on the selected file. Multiple operations may be performed until the triggering condition is resolved or until the time period for the operation has not passed. In this manner, embodiments of the present invention provide an automated solution for performing various data and storage management operations. Policy-driven data and storage management processing is automatically determined and performed.

Figure 3:
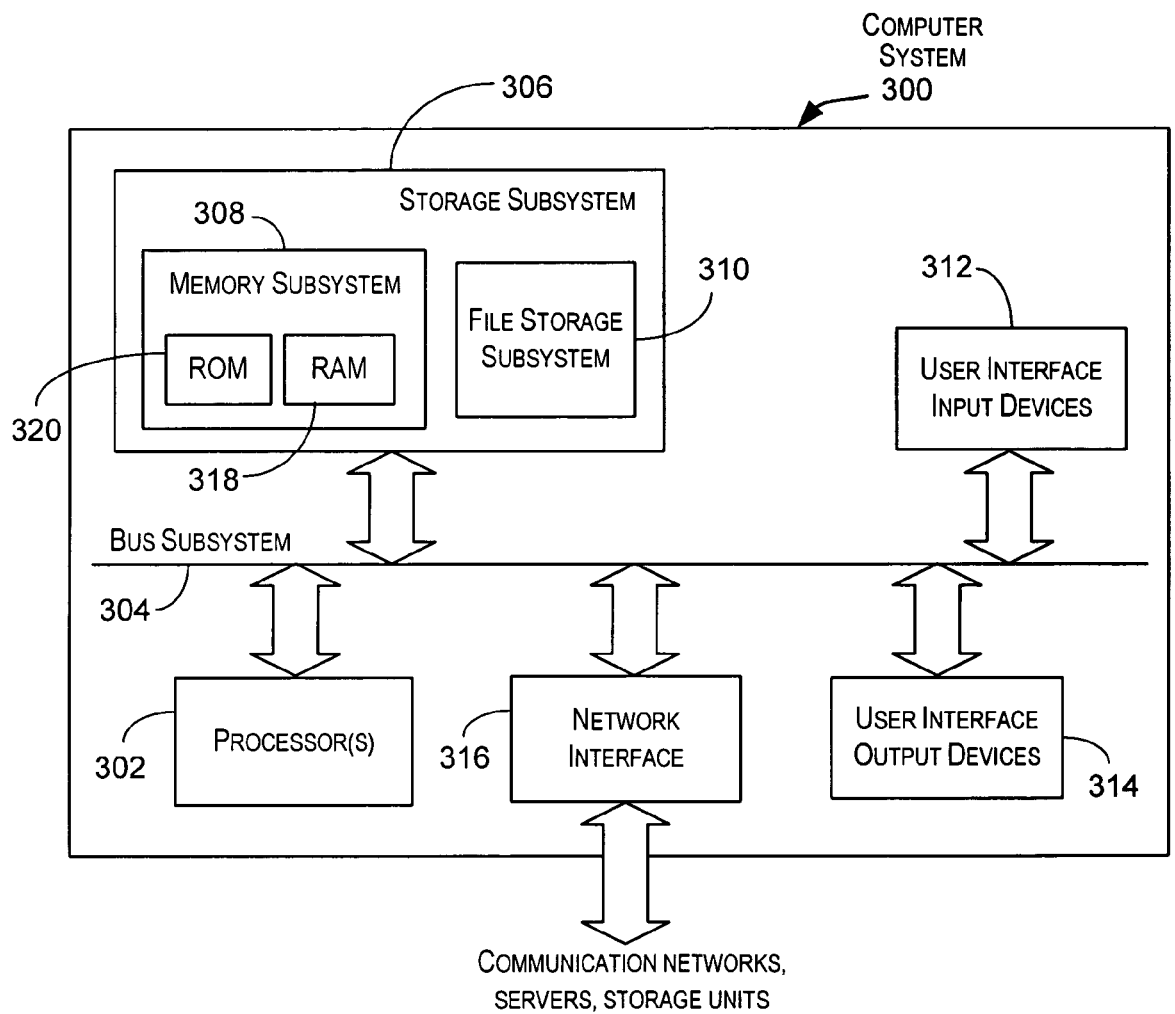
FIG. 3 is a simplified block diagram of a computer system that may be used to perform processing according to an embodiment of the present invention.

FIG. 3 is a simplified block diagram of a computer system 300 that may be used to perform processing according to an embodiment of the present invention. As shown in FIG. 3, computer system 300 includes a processor 302 that communicates with a number of peripheral devices via a bus subsystem 304. These peripheral devices may include a storage subsystem 306, comprising a memory subsystem 308 and a file storage subsystem 310, user interface input devices 312, user interface output devices 314, and a network interface subsystem 316. The input and output devices allow a user, such as the administrator, to interact with computer system 300.

Network interface subsystem 316 provides an interface to other computer systems, networks, servers, and storage units. Network interface subsystem 316 serves as an interface for receiving data from other sources and for transmitting data to other sources from computer system 300. Embodiments of network interface subsystem 316 include an Ethernet card, a modem (telephone, satellite, cable, ISDN, etc.), (asynchronous) digital subscriber line (DSL) units, and the like.

User interface input devices 312 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 300.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 may be configured to store the basic programming and data constructs that provide the functionality of the present invention. For example, according to an embodiment of the present invention, software code modules (or instructions) implementing the functionality of the present invention may be stored in storage subsystem 306. These software modules or instructions may be executed by processor(s) 302. Storage subsystem 306 may also provide a repository for storing data used in accordance with the present invention. For example, information used for enabling backup and restore operations without performing recalls may be stored in storage subsystem 306. Storage subsystem 306 may also be used as a migration repository to store data that is moved from a storage unit. Storage subsystem 306 may also be used to store data that is moved from another storage unit. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Computer system 300 can be of various types including a personal computer, a portable computer, a workstation, a network computer, a mainframe, a kiosk, or any other data processing system. Due to the ever-changing nature of computers and networks, the description of computer system 300 depicted in FIG. 3 is intended only as a specific example for purposes of illustrating the preferred embodiment of the computer system. Many other configurations having more or fewer components than the system depicted in FIG. 3 are possible.

Techniques for Calculating DVSs

As described above, DVSs are calculated for files and are used to select a file on which the selected operation is to be performed. As previously stated, each policy may comprise file selection information (or file-related information). The file selection information may specify various conditions or criteria related to attributes or characteristics of the file (e.g., file size, file type, etc.) (referred to as "file characteristics information"). The conditions may also be related to file usage information (e.g., when the file was created, last used, modified, etc.) The conditions may be connected by Boolean connectors. DVSs are calculated for files based upon the file selection information. The calculated DVSs may then be used to select a file for the policy-specified operation.

Each policy may also comprise information ("storage unit selection information") that is used to determine target storage units for the selected operation. According to an embodiment of the present invention, the storage unit selection information is used to calculate SVSs for the storage units as described below.

FIG. 4 depicts examples of policies (or rules) according to an embodiment of the present invention. In FIG. 4, each row of table 400 specifies a policy. Column 402 of table 400 identifies the file characteristics information for each policy, column 404 of table 400 identifies the file usage information for each policy, and column 406 of table 400 identifies the storage unit selection information for each policy. Although not shown in FIG. 4, other information may also be associated with each policy such as information specifying an operation to be performed, information indicating a technique to be used for selecting files based upon DVSs calculated for the files, prioritization or ordering information, etc. However, for sake of simplicity, only information that is used for calculating DVSs and SVSs according to an embodiment of the present invention is shown in FIG. 4.

The file characteristics information may specify various conditions related to characteristics of files. One or more conditions may be specified related to characteristics of a file such as file type, relevance score of file, file owner, file size, file attributes, etc. Each condition may be expressed as an absolute value (e.g., File type is "Office files") or as an inequality (e.g., Relevance score of file >=0.5). Multiple conditions may be connected by Boolean connectors (e.g., File type is "Email files" AND File owner is "John Doe") to form a Boolean expression. The file characteristics information may also be left empty (i.e., not configured or set to NULL value), e.g., file characteristic information for policies P6 and P7 in FIG. 4. According to an embodiment of the present invention, if no information is specified, the file characteristics information defaults to a NULL value which is valid and indicates that all files are equally eligible for selection for that policy.

The "file usage information" specifies conditions related to file usage. For example, for a particular policy, this information may specify conditions related to when the file was last accessed, created, last modified, and the like. One or more conditions may be specified for each policy connected using Boolean connectors. The file usage information may be specified as equality conditions (e.g., "file created on Jun. 7, 2004") or inequality conditions (e.g., "file last accessed between 7 days to 30 days ago"). The file characteristics information and file usage information may be set by an administrator.

According to an embodiment of the present invention, the DVS calculated for a file for a particular policy indicates a degree to which the file matches the file characteristics information and file usage information for the particular policy.

Several different techniques may be used for generating a DVS for a file for a policy. According to one embodiment, the DVS for a file using a particular policy is a simple product of a "file_characteristics_score" and a "file_usage_score", i.e., DVS=file_characteristics_score*file_usage_score In the above equation, the file_characteristics_score and the file_usage_score are equally weighed in the calculation of DVS. However, in alternative embodiments, differing weights may be allocated to the file_characteristics_score and the file_usage_score to emphasize or deemphasize their effect. According to an embodiment of the present invention, the value of DVS for a file for a policy is in the range between 0 and 1 (both inclusive).

According to an embodiment of the present invention, the file_characteristics_score for a file for a policy is calculated based upon the file characteristics information of the policy and the characteristics of the file. The file characteristics information specified for a policy may comprise one or more conditions connected by Boolean connectors. Accordingly, calculation of the file_characteristics_score involves calculating numerical values for the individual conditions and then combining the individual condition scores to calculate the file_characteristics_score for the policy.

The file_usage_score for a file for a policy is calculated based upon the file usage information specified for the policy and the file usage information for the file. The file usage information specified for s policy may comprise one or more conditions connected by Boolean connectors. Accordingly, calculation of the file_usage_score involves calculating numerical values for the individual conditions and then combining the individual condition scores to calculate the file_usage_score for the policy for the file.

According to an embodiment of the present invention, the following rules are used to combine individual condition scores generated for the individual conditions to calculate a file_characteristics_score or file_usage_score:

Rule 1: For an N-way AND expression (i.e., for N conditions connected by an AND Boolean connector), the resultant value is the sum of all the individual values calculated for the individual conditions divided by N.

Rule 2: For an N-way OR expression (i.e., for N conditions connected by an OR connector), the resultant value is the largest value calculated for the N conditions.

Rule 3: The file_characteristics_score and the file_usage_score are between 0 and 1 (both inclusive).

According to an embodiment of the present invention, the value for each individual condition specified in file characteristics information is calculated using the following guidelines:

(a) If a NULL (or empty) value is specified in the file characteristics information then the file_characteristics_score is set to 1. For example, the file_characteristics_score for policies P6 and P7 depicted in FIG. 4 is set to 1.

(b) The score for a condition is set to 1 if the condition is satisfied.

(c) For file type and ownership condition evaluations, a score of 1 is assigned for a condition if the condition is met, else a score of 0 is assigned. For example, for policy P4 depicted in FIG. 4, if the file for which the DVS is calculated is of type "Email Files", then a score of 1 is assigned for the condition. The file_characteristics_score for policy P4 is also set to 1 since it comprises only one condition. However, if the file is not an email file, then a score of 0 is assigned for the condition in P4 and since it is the only condition, the file_characteristics_score is also set to 0 for P4.

(d) If a condition involves an equality test of the "relevance score" (a relevance score may be assigned for a file by an administrator), the condition score is set to 1 if the equality test is satisfied. Else, the score for the condition is calculated using the following equations:

$RelScore_{File}$=Relevance score of the file $RelScore_{Rule}$=Relevance score specified in the file characteristics information condition Delta=$abs(RelScore_{File} - RelScore_{Rule})$ Score for the condition=$1-(Delta/RelScore_{Rule})$ The score for the condition is reset to 0 if it is negative.

(e) If the condition involves an inequality test (e.g., using >, >=, < or <=) related to the "relevance score" (e.g., policy P5 in FIG. 4), the condition score is set to 1 if the inequality test is satisfied. Else, the score for the condition is calculated using the following equations:

$RelScore_{File}$=Relevance score of the data file $RelScore_{Rule}$=Relevance score specified in the file selection criteria information Delta=$abs(RelScore_{File} - RelScore_{Rule})$ Score for the condition=$1-(Delta/RelScore_{Rule})$ The score for the condition is reset to 0 if it is negative.

Once scores for the individual conditions specified in the file characteristics information have been calculated, the file_characteristics_score is then calculated using Rules 1, 2, and 3, as described above. The file_characteristics_score represents the degree of matching (or suitability) between the file characteristics information of the particular policy and the file for which the score is calculated. It should be evident that various other techniques may also be used to calculate the file_characteristics_score in alternative embodiments of the present invention.

According to an embodiment of the present invention, the score for each condition specified in the file usage information for a policy is scored using the following guidelines:

(a) The score for a condition is set to 1 if the condition is satisfied.

(b) $Date_{File}$=Relevant date information for the file for which the score is being calculated Date$_{File}$=Relevant date information in the rule.

Delta=$abs$(Date$_{File}$−Date$_{Rule}$)

Score for the file usage information condition=1−
(Delta/Date$_{Rule}$)

The Score is reset to 0 if it is negative.

(c) If a date range is specified in the condition (e.g., last 7 days), then the date range is converted back to the absolute date before the evaluation is made.

Once scores for the individual conditions specified in the file usage information have been calculated, the file_usage_score is then calculated using Rules 1, 2, and 3, as described above. The file_usage_score represents the degree of matching (or suitability) between the file usage information of the particular policy and the usage information associated with the file for which the score is calculated. It should be evident that various other techniques may also be used to calculate the file_usage_score in alternative embodiments of the present invention.

The DVS for the file is then calculated based upon the file_characteristics_score and file_usage_score. The DVS for a policy thus quantifies the degree of matching (or suitability) between the conditions specified in the file selection information (comprising the file characteristics information and the file usage information) for the policy and the characteristics and usage of the file for which the score is calculated. According to an embodiment of the present invention, higher DVS scores are generated for files that are deemed more important or valuable (or more relevant for the policy).

If two or more files have the same calculated DVS for a policy, then several guidelines may be used to break the ties. The guidelines may be based upon the operation specified by the policy that is to be performed. According to an embodiment of the present invention, the following tie-breaking rules are used:

(a) The files are ranked based upon priorities assigned to the files by a user (e.g., system administrator) of the storage environment.

(b) If no priorities have been set for the "tied" files or if the priorities are equal, then the total number of number of conditions connected using AND connectors used in calculating the file_characteristics_score and the file_usage_score for a policy are used to break the tie. A file that meets a greater number of the AND conditions from the file characteristics information and file usage information is ranked higher than a file that satisfies a lesser number of AND conditions. The rationale here is that a file that meets a more specific configuration (indicated by satisfying a greater number of AND conditions) is assumed to carry more weight than a file satisfying fewer AND conditions.

(c) If neither (a) nor (b) is able to break the tie between the "tied" files, some other criteria may be used to break the tie. For example, the order in which the files are encountered may be used to break the tie. In this embodiment, a file that is encountered earlier is ranked higher than a subsequent file. Various other criteria may also be used to break ties.

According to another embodiment of the present invention, all files that meet the conditions specified in the file selection information for a policy are assigned a DVS of 1. In order to break ties, DVS are recalculated for the "tied" files using another equation such as:

$DVS$=file_size/last_access_time where:
file_size is the size of the file; and
last_access_time is the last time that the file was accessed.

It should be noted that this DVS calculation calculates DVSs for files based on their impact to the overall system when they are moved or copied from the source volume, with a higher score representing a lower impact. In this embodiment, moving a larger file is more effective to balance capacity utilization and moving or copying a file that has not been accessed recently reduces the chances that the file will be recalled.

It should be evident that various other techniques may also be used to calculate DVSs for files. Technique used to calculate DVSs may depend on the policy-specified operation to be performed. The technique for calculating DVSs may be specified as part of the policy.

Techniques for Calculating SVSs

As previously stated, each policy may also comprise information ("storage unit selection information") that is used to determine target storage units for the selected operation. According to an embodiment of the present invention, the storage unit selection information is used to calculate SVSs for the storage units. The storage unit selection information may comprise conditions or criteria related to storage unit characteristics such as available bandwidth, available storage capacity, constraints on storage units, etc. As shown in FIG. 4, the storage unit selection information for a particular policy specifies one or more constraints associated with storing information on a storage unit for a particular policy. The storage unit selection information may be left empty or may be set to NULL to indicate that no constraints are applicable for the policy. For example, no constraints have been specified for policy P3 in FIG. 4.

As depicted in FIG. 4, storage unit selection information may be set to LOCAL (e.g., storage unit selection information for policies P1 and P6). This indicates that the file is to be stored on a local storage unit that is local to a server. A specific storage unit or a group of storage units (e.g., policy P4) may be specified in the storage unit selection information indicating that only the specified storage units are to be considered as potential target storage units. Bandwidth conditions (e.g., a minimum bandwidth requirement such as "Bandwidth >=10 MB/s") may be specified indicating that only those storage units that satisfy the specified bandwidth condition are to be considered for target storage units. Various other conditions related to other characteristics of storage units (e.g., constraints related to file size, availability, storage capacity, etc.) may also be specified in the storage unit selection information for a policy.

According to an embodiment of the present invention, SVS are calculated for storage units for a policy based upon the storage unit selection information for a policy. The calculated SVSs are then used to determine a target storage unit. According to an embodiment of the present invention, a SVS for a storage unit is calculated using the following steps:

STEP 1: A "Bandwidth_factor" variable is set to zero (0) if the bandwidth supported by a storage unit for which the score is calculated is less than the bandwidth requirement, if any, specified in the storage unit selection information specified for a selected policy. For example, the storage unit selection information for policy P2 in FIG. 4 specifies that the bandwidth of the storage unit should be greater than 40 MB. Accordingly, if the bandwidth supported by a storage unit is less than 40 MB, then the "Bandwidth_factor" variable is set to 0 for that storage unit. Otherwise, the value of "Bandwidth_ factor" is computed as follows:

$$Bandwidth\_factor=((Bandwidth\ supported\ by\ the\ storage\ unit)-(Bandwidth\ required\ by\ the\ storage\ unit\ selection\ information\ of\ the\ selected\ policy))*K$$

where K is set to some constant integer. According to an embodiment of the present invention, K is set to 1.

STEP 2: SVS for a storage unit according to an embodiment of the present invention is calculated as follows:

$$SVS=Bandwidth\_factor*(desired\_threshold\_\%-current\_usage\_\%)/cost$$

The desired_threshold_% for a storage unit is usually set by a system administrator and indicates a storage capacity threshold for a storage unit. Each threshold may be expressed as a percentage of the total capacity of the storage unit. For a particular storage unit, thresholds may also be defined for particular types of data to be stored on the storage unit. Each threshold associated with a data type may indicate the percentage of total capacity of the storage unit that the user desires to allocate for storing data of the particular type.

The current_usage_% value indicates the current capacity usage of a storage unit and may be monitored by embodiments of the present invention.

The "cost" value may be set by the system administrator and indicates the cost of storing data on the storage unit. The cost may be measured as number of dollars per unit of memory (e.g., dollars-per-Gigabyte, dollars-per-Megabyte, etc). A system administrator or user of the present invention may configure this information.

It should be understood that the formula for calculating SVS shown above is representative of an embodiment of the present invention and is not meant to reduce the scope of the present invention. Various other factors may be used for calculating the SVS in alternative embodiments of the present invention. For example, according to an embodiment of the present invention, the availability of a storage unit may also be used to determine the SVS for the device. Availability of a storage unit indicates the amount of time that the storage unit is available during those time periods when it is expected to be available. Availability may be measured as a percentage of an elapsed year in certain embodiments. For example, 99.95% availability equates to 4.38 hours of downtime in a year (0.0005*365*24=4.38) for a storage unit that is expected to be available all the time. According to an embodiment of the present invention, the value of SVS for a storage unit is directly proportional to the availability of the storage unit.

STEP 3: Various adjustments may be made to the SVS calculated according to the above steps. For example, in some storage environments, the administrator may want to group "similar" files together on one storage unit. In other environments, the administrator may want to distribute files among different storage units. The SVS may be adjusted to accommodate the policy adopted by the administrator. Performance characteristics associated with a network that is used to transfer data from the storage units may also be used to adjust the SVSs for the storage units. For example, the access time (i.e., the time required to provide data stored on a storage unit to a user) of a storage unit may be used to adjust the SVS for the storage unit. The throughput of a storage unit may also be used to adjust the SVS value for the storage unit. Parameters such as the location of the storage unit, location of the data source, and other network related parameters might also be used to generate SVSs. According to an embodiment of the present invention, the SVS value is calculated such that it is directly proportional to the desirability of storing data on the storage unit for a given policy.

According to an embodiment of the present invention, a higher SVS value represents a more desirable storage unit for selection as a target storage unit for the operation to be performed. According to the SVS formula shown above, the SVS value is directly proportional to the available capacity percentage. Accordingly, a storage unit whose current_usage_% is low has more capacity for storage and is thus more desirable for selection as a target storage unit. The SVS value is inversely proportional to the cost of storing data on the storage unit. Accordingly, a storage unit with lower storage costs is more desirable for selection as a target storage unit. The SVS value is directly proportional to the bandwidth requirement. Accordingly, a storage unit supporting a higher bandwidth is more desirable for selection as a target storage unit for an operation. SVS is zero if the bandwidth requirements are not satisfied. Accordingly, the SVS formula for a particular storage unit combines the various storage unit characteristics to generate a score that represents the degree or desirability of selecting the storage unit as a target storage unit and the desirability of storing data on the particular storage unit.

According to the above formula, SVS is zero (0) if the value of Bandwidth_factor is zero and/or the desired_threshold_% is equal to the current_usage_%. As described above, Bandwidth_factor is set to zero if the bandwidth supported by the storage unit is less than the bandwidth requirement, if any, specified in the storage unit selection information specified for the selected policy. Accordingly, if the value of SVS for a particular storage unit is zero (0) it may imply that bandwidth supported by the storage unit is less than the bandwidth required by the policy.

The SVS may also be zero if the desired_threshold_% is equal to the current_usage_%. Accordingly, the SVS for a storage unit may be zero if the storage unit is already at or exceeds the desired capacity threshold.

Based upon the above formula, if the SVS for a storage unit is positive, it indicates that the storage unit meets both the bandwidth requirements (i.e., Bandwidth_factor is non zero) and also has enough capacity for storing the file (i.e., desired_threshold_% is greater than the current_usage_%). The higher the SVS value, the more suitable (or desirable) the storage unit is for storing a file and for selection as a target storage unit. Among storage units with positive SVSs, the storage unit with the highest positive SVS is the most desirable candidate for storing the file and selection as a target storage unit. The SVS for a particular storage unit for a particular policy thus provides a measure of the degree of desirability of selecting the particular storage unit as a target storage unit for the operation specified by a particular policy.

The SVS for a particular storage unit may be negative if the storage unit meets the bandwidth requirements but the storage unit's usage is above the intended threshold (i.e., current_usage_% is greater than the desired_threshold_%). The relative magnitude of the negative value indicates the degree of over-capacity of the storage unit. Among storage units with negative SVSs, the closer the SVS is to zero (0) and the storage unit has sufficient capacity for storing the data, the more desirable the storage unit is for storing the data file and for selection as a target storage unit. For example, a storage unit having a SVS of −0.1 is a more attractive candidate for selection as a target storage unit than a second storage unit having an SVS of −0.9. Accordingly, even if SVSs are negative for storage units, the negative values can be used to select a storage unit as a target storage unit.

The SVS for a particular storage unit for a particular policy thus serves as a measure for determining the degree of desirability or suitability of selecting the particular storage unit as a target storage unit for the operation specified by the particular policy. A storage unit having a positive SVS value is a better candidate for storing data and thus a better candidate for selection as a target storage unit than a storage unit with a negative SVS value, since a positive value indicates that the storage unit meets the bandwidth requirements for the data file and also possesses sufficient capacity for storing the file. Among storage units with positive SVS values, a storage unit with a higher positive SVS is a more desirable candidate for selection as a target storage unit as compared to a storage unit with a lower SVS value, i.e., the storage unit having the highest positive SVS value is the most desirable storage unit for storing the data file. If a storage unit with a positive SVS value is not available, then storage units with negative SVS values are more desirable than storage units with a SVS value of zero (0). The rationale here is that it is better to select a storage unit that satisfies the bandwidth requirements (even though the storage unit is over capacity) than a storage unit that does not meet the bandwidth requirements (i.e., has a SVS of zero). Among storage units with negative SVS values, a storage unit with a higher SVS value (i.e., SVS closer to 0) is a more desirable candidate for storing the data file and thus for selection as a target storage unit than a storage unit with a lesser SVS value. Accordingly, among storage units with negative SVS values, the storage unit with the highest SVS value (i.e., SVS closest to 0) is the most desirable candidate for selection as a target storage unit. In this manner, SVSs may be calculated for storage unit for a particular policy and used to select a particular storage unit as a target storage unit.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of managing a storage environment comprising a plurality of storage units, the method comprising:
    determining a first policy configured for the storage environment, wherein a first operation is associated with the first policy;
    calculating, using a processor and a memory of a computer, a data value score for each file in a set of files stored on a first storage unit from the plurality of storage units;
    selecting a first file from the set of files for performing the first operation based upon the data value scores calculated for the files in set of files and based upon the first operation to be performed; and
    performing the first operation on the selected first file.

2. The method of claim 1 wherein selecting the first file from the set of file comprises:
    determining, based upon the first operation to be performed, a first selection technique from a plurality of selection techniques; and
    selecting, based upon data values scores calculated for the set of files, the first file from the set of files for performing the first operation by applying the first selection technique.

3. The method of claim 1 wherein selecting the first file from the set of files for performing the first operation comprises:
    using a first selection technique for selecting the file from the set of files upon determining that the first operation is of a first type; and
    using a second selection technique for selecting the file from the set of files upon determining that the first operation is of a second type, wherein the second selection technique is different from the first selection technique.

4. The method of claim 1 wherein:
    the data value score calculated for a file indicates a value of the file; and
    selecting the first file from the set of files for performing the first operation comprises:
    selecting, based upon the data value scores for the set of files, a file having highest value upon determining that the first operation is of a first type; and
    selecting, based upon the data value scores for the set of files, a file having lowest value upon determining that the first operation is of a second type.

5. The method of claim 4 wherein the first operation of the second type is an operation to delete a file.

6. The method of claim 1 wherein selecting the first file from the set of files for performing the first operation comprises:
    using a first selection technique for selecting the file from the set of files upon determining that the first operation is to move a file from the first storage unit to second storage unit that is slower than the first storage unit; and
    using a second selection technique for selecting the file from the set of files upon determining that the first operation is to move a file from the first storage unit to a storage unit that is faster than the first storage unit.

7. The method of claim 1 wherein performing the first operation comprises deleting the first file from the first storage unit.

8. The method of claim 1 wherein performing the first operation comprises migrating the first file from the first storage unit.

9. The method of claim 1 further comprising determining a second storage unit for the first operation.

10. The method of claim 9 wherein performing the first operation comprises copying the first file to the second storage unit.

11. The method of claim 9 wherein performing the first operation comprises moving the first file from the first storage unit to the second storage unit.

12. The method of claim 9 wherein performing the first operation comprises backing-up the first file to the second storage unit.

13. The method of claim 9 wherein determining the second storage unit comprises:
    calculating a storage value score for a set of storage units from the plurality of storage units; and selecting a storage unit from the set of storage units as the second storage unit based upon the storage value scores calculated for storage units in the set of storage units.

14. The method of claim 1 further comprising:
detecting a first trigger; and
performing the determining, calculating, selecting, and performing the first operation steps responsive to detecting the first trigger.

15. The method of claim 14 further comprising monitoring storage capacity for the plurality of storage units;
wherein detecting the first trigger comprises detecting that storage capacity for at least one storage unit from the plurality of storage units has exceeded a threshold value.

16. The method of claim 14 further comprising monitoring one or more files stored by the plurality of storage units;
wherein detecting the first trigger comprises detecting presence of a file having a first characteristic.

17. The method of claim 1 wherein determining the first policy comprises:
determining a priority associated with each policy in a plurality of policies; and
selecting a policy with the highest associated priority from the plurality of policies as the first policy.

18. The method of claim 1 wherein calculating the data value score for each file in the set of files stored on the first storage unit comprises:
determining a set of file-related conditions specified by the first policy; and
calculating a data value score for each file in the set of files based upon the file selection conditions, wherein the data value score for a file indicates the degree to which the set of file-related conditions are satisfied by the file.

19. A computer readable medium storing a set of code modules which when executed by a processor of a computer system cause the processor to manage a storage environment comprising a plurality of storage units, the computer readable medium comprising:
code for determining a first policy configured for the storage environment, wherein a first operation is associated with the first policy;
code for calculating a data value score for each file in a set of files stored on a first storage unit from the plurality of storage units using the processor of the computer system;
code for selecting a first file from the set of files for performing the first operation based upon the data value scores calculated for the files in set of files and based upon the first operation to be performed; and
code for performing the first operation on the selected first file.

20. The computer readable medium of claim 19 wherein the code for selecting the first file from the set of file comprises:
code for determining, based upon the first operation to be performed, a first selection technique from a plurality of selection techniques; and
code for selecting, based upon data values scores calculated for the set of files, the first file from the set of files for performing the first operation by applying the first selection technique.

21. The computer readable medium of claim 19 wherein the code for selecting the first file from the set of files for performing the first operation comprises:
code for using a first selection technique for selecting the file from the set of files upon determining that the first operation is of a first type; and
code for using a second selection technique for selecting the file from the set of files upon determining that the first operation is of a second type, wherein the second selection technique is different from the first selection technique.

22. The computer readable medium of claim 19 wherein:
the data value score calculated for a file indicates a value of the file; and
the code for selecting the first file from the set of files for performing the first operation comprises:
code for selecting, based upon the data value scores for the set of files, a file having highest value upon determining that the first operation is of a first type; and
code for selecting, based upon the data value scores for the set of files, a file having lowest value upon determining that the first operation is of a second type.

23. The computer readable medium of claim 19 wherein the code for selecting the first file from the set of files for performing the first operation comprises:
code for using a first selection technique for selecting the file from the set of files upon determining that the first operation is to move a file from the first storage unit to second storage unit that is slower than the first storage unit; and code for using a second selection technique for selecting the file from the set of files upon determining that the first operation is to move a file from the first storage unit to a storage unit that is faster than the first storage unit.

24. The computer readable medium of claim 19 wherein the first operation is at least of an operation to delete the first file from the first storage unit, an operation to migrate the first file from the first storage unit, an operation to archive the first file, and an operation to restore the first file.

25. The computer readable medium of claim 19 further comprising code for determining a second storage unit for the first operation.

26. The computer readable medium of claim 25 wherein the first operation is at least one of an operation to copy the first file to the second storage unit, an operation to move the first file from the first storage unit to the second storage unit, and an operation to backup the first file to the second storage unit.

27. The computer readable medium of claim 25 wherein the code for determining the second storage unit comprises:
code for calculating a storage value score for a set of storage units from the plurality of storage units; and
code for selecting a storage unit from the set of storage units as the second storage unit based upon the storage value scores calculated for storage units in the set of storage units.

28. The computer readable medium of claim 19 further comprising:
code for detecting a first trigger; and
code for performing the determining, calculating, selecting, and performing the first operation responsive to detecting the first trigger.

29. The computer readable medium of claim 28 further comprising code for monitoring storage capacity for the plurality of storage units;
wherein the code for detecting the first trigger comprises code for detecting that storage capacity for at least one storage unit from the plurality of storage units has exceeded a threshold value.

30. The computer readable medium of claim 28 further comprising code for monitoring one or more files stored by the plurality of storage units;

wherein the code for detecting the first trigger comprises code for detecting presence of a file having a first characteristic.

31. The computer readable medium of claim 19 wherein the code for determining the first policy comprises:
   code for determining a priority associated with each policy in a plurality of policies; and
   code for selecting a policy with the highest associated priority from the plurality of policies as the first policy.

32. The computer readable medium of claim 19 wherein the code for calculating the data value score for each file in the set of files stored on the first storage unit comprises:
   code for determining a set of file-related conditions specified by the first policy; and
   code for calculating a data value score for each file in the set of files based upon the file selection conditions, wherein the data value score for a file indicates the degree to which the set of file-related conditions are satisfied by the file.

33. A system for managing a storage environment, the system comprising:
   a plurality of storage units; and
   a data processing system, including a processor and a memory, coupled with the plurality of storage units;
   wherein the data processing system is configured to:
      determine a first policy configured for the storage environment, wherein a first operation is associated with the first policy;
      calculate a data value score for each file in a set of files stored on a first storage unit from the plurality of storage units using the processor and memory;
      select a first file from the set of files for performing the first operation based upon the data value scores calculated for the files in set of files and based upon the first operation to be performed; and
      cause the first operation to be performed on the selected first file.

34. The system of claim 33 wherein the data processing system is configured to:
   determine, based upon the first operation to be performed, a first selection
   technique from a plurality of selection techniques; and
   select, based upon data values scores calculated for the set of files, the first file from the set of files for performing the first operation by applying the first selection technique.

35. The system of claim 33 wherein the data processing system is configured to:
   use a first selection technique for selecting the file from the set of files upon determining that the first operation is of a first type; and
   use a second selection technique for selecting the file from the set of files upon determining that the first operation is of a second type, wherein the second selection technique is different from the first selection technique.

36. The system of claim 33 wherein:
   the data value score calculated for a file indicates a value of the file; and the data processing system is configured to:
   select, based upon the data value scores for the set of files, a file having highest value upon determining that the first operation is of a first type; and
   select, based upon the data value scores for the set of files, a file having lowest value upon determining that the first operation is of a second type.

37. The system of claim 33 wherein the data processing system is configured to:
   use a first selection technique for selecting the file from the set of files upon determining that the first operation is to move a file from the first storage unit to second storage unit that is slower than the first storage unit; and
   use a second selection technique for selecting the file from the set of files upon determining that the first operation is to move a file from the first storage unit to a storage unit that is faster than the first storage unit.

38. The system of claim 33 wherein the first operation is at least of an operation to delete the first file from the first storage unit, an operation to migrate the first file from the first storage unit, an operation to archive the first file, and an operation to restore the first file.

39. The system of claim 33 wherein the data processing system is configured to determine a second storage unit for the first operation.

40. The system of claim 39 wherein the first operation is at least one of an operation to copy the first file to the second storage unit, an operation to move the first file from the first storage unit to the second storage unit, and an operation to backup the first file to the second storage unit.

41. The system of claim 39 wherein the data processing system is configured to:
   calculate a storage value score for a set of storage units from the plurality of storage units; and
   select a storage unit from the set of storage units as the second storage unit based upon the storage value scores calculated for storage units in the set of storage units.

42. The system of claim 33 wherein the data processing system is configured to:
   detect a first trigger; and
   perform the determining, calculating, selecting, and performing the first operation steps responsive to detecting the first trigger.

43. The system of claim 42 wherein the data processing system is configured to:
   monitor storage capacity for the plurality of storage units; and
   detect that storage capacity for at least one storage unit from the plurality of storage units has exceeded a threshold value.

44. The system of claim 42 wherein the data processing system is configured to:
   monitor one or more files stored by the plurality of storage units; and
   detect presence of a file having a first characteristic.

45. The system of claim 33 wherein the data processing system is configured to:
   determine a priority associated with each policy in a plurality of policies; and
   select a policy with the highest associated priority from the plurality of policies as the first policy.

46. The system of claim 33 wherein the data processing system is configured to:
   determine a set of file-related conditions specified by the first policy; and
   calculate a data value score for each file in the set of files based upon the file selection conditions, wherein the data value score for a file indicates the degree to which the set of file-related conditions are satisfied by the file.

47. A method for managing a storage environment comprising a plurality of storage units, the method comprising:

calculating, based upon a storage policy, a data value score for each file in a set of files stored on a first storage unit from the plurality of storage units using a processor and a memory of a computer;

selecting a first file from the set of files based upon the data value scores calculated for the set of files; and performing a first operation on the selected first file.

48. A method for managing a storage environment comprising a plurality of storage units, the method comprising:

receiving a trigger to store a first file;

calculate, based upon a storage policy configured for the storage environment, a storage value score for each storage unit in a set of storage units from the plurality of storage units using a processor and a memory of a computer; and select a first storage unit from the set of storage units based upon the storage value scores calculated for the storage units in the set of storage units; and storing the first file on the first storage unit.

\* \* \* \* \*